Patented June 4, 1946

2,401,537

UNITED STATES PATENT OFFICE 2,401,537

TREATMENT OF GLASS SURFACES

Frederick W. Adams, Pittsburgh, Pa., assignor to Pittsburgh Plate Glass Company, Allegheny County, Pa., a corporation of Pennsylvania No Drawing. Application February 27, 1943, Serial No. 477,445

1 Claim. (Cl. 117—54)

The present invention relates to a method of treating glass surfaces, in order to reduce the transmission of ultra-violet and/or infra-red rays.

The object of the invention is to provide a glass highly resistant to ultra-violet and infra-red rays, which is relatively inexpensive to obtain.

A second object is to provide a glass of the foregoing type, which is relatively low in surface reflectance.

These and other objects of the invention will be apparent from consideration of the following specification and the appended claim.

It has heretofore been recognized that the resistance of glass to the transmission of ultra-violet and infra-red rays could be substantially increased by incorporating with the glass mixtures of ferrous and ferric iron compounds. These glasses are suitable for use as a protection against fading and discoloration of valuable documents by the action of light. They are also employed as a means to admit light into buildings and at the same time to screen out a portion of the heat which would otherwise be admitted along with the light. Conventionally these ultra-violet and infra-red ray-resisting glasses are made up by melting of special batches containing the requisite ingredients. These glasses are comparatively expensive to produce.

In accordance with the provisions of the present invention it is proposed to increase the ultra-violet and infra-red ray resistance of ordinary glass by introducing ferrous and ferric compounds into the surface of the glass sheet after it has been formed. This may be effected by dissolving out a portion of the alkali metal and alkali earth metal compounds of an ordinary transparent glass, such as lime soda, window glass, with acid to provide a surface which is more or less absorbent and introducing into the surface soluble ferrous and ferric salts, such as ferrous and ferric sulfate or chloride. To a certain extent a base exchange between the glass and the treating solution is effected and the percentage of iron salts of the glass surface is so increased as to improve the resistance of the glass to transmission of objectionable rays.

In accordance with the provisions of the invention the glass may be treated with acid to leach out the more soluble constituents, such as sodium and calcium compounds and leave a surface film which is substantially enriched in silica. In my copending application Ser. No. 357,707, Patent No. 2,348,704, filed September 21, 1940 and entitled "Treatment of glass surface," and Ser. No. 430,632, filed February 12, 1942 and entitled "Process of forming films upon the surfaces of glass plates," are disclosed processes of preliminarily etching the glasses, in order to render them receptive to the iron salts.

According to the first-mentioned application, a glass body, such as a plate of glass containing silica and alkali and alkali earth metal oxides, as well as some alumina, lead oxide, etc. is subjected to a leaching action, first with a strong mineral acid, such as nitric acid or hydrochloric acid, in order to remove more soluble constituents, e. g., the alkali and alkali earth metals from the surface of the glass. In this operation a .5 normal nitric acid or hydrochloric acid may be employed and applied for a period of about 90 seconds. Subsequently the glass is treated with dilute hydrofluoric acid, such as a solution obtained by adding 2.5 cc. of hydrofluoric acid to 900 cc. of distilled water. The treatment with hydrofluoric acid is continued for about 60 seconds. The temperatures employed in these operations may be approximately normal room temperature. The soluble iron compounds, e. g., ferric chloride or sulfate may be included in the hydrofluoric acid solution. A suitable composition would be one which was:

2 N. in hydrochloric acid
1 N. in sodium chloride
0.5 N. in ferrous and ferric chlorides in combination The iron salt may, also, be omitted from the acid bath, if so desired, in which case the glass may be washed in order to remove the etching acids and then subjected to treatment with a mixture of ferrous and ferric salts.

The ratio of ferrous to ferric iron salts may be varied over considerable range, for example, from 30 to 60 percent of the former, the remainder being ferric. The glass after treatment is washed and baked at 200° C., in order to harden the surface films. The resultant films of course are substantially enriched in both silica and iron and correspondingly impoverished in the soluble alkali and alkali earth metal compounds. The films are resistant to staining and abrasion.

In accordance with the provisions of the second-mentioned of my copending applications the glass in transparent, vitreous state may be etched or treated with a water solution containing a mixture of an etching acid, such as hydrochloric acid and an alkali metal salt, thereby increasing the efficiency of removal of the alkali earth metal salts and providing a glass surface having higher resistance to staining under the action of moisture. In this operation a body of glass, such as a flat plate of window glass, may be immersed in a water solution of hydrochloric acid of a normality of about 2 and sodium chloride of a normality of about 1. The temperature of operation may be approximately 150° to 200° C., which of necessity requires the use of an autoclave as a receptacle for the solutions. The treatment is continued to obtain sufficient depth of etching. If it is continued until a bluish or brownish coloration is to be observed the films will be found to have non-reflective properties, which are often desirable.

The iron compounds, e. g., a mixture of ferrous and ferric chloride may be included in the etching bath or the plates after the etching operation, may be washed to remove acids and then immersed in any water solution of a mixture of ferrous and ferric salts, such as ferrous and ferric sulfate. The concentrations of these solutions may be over a relatively broad range, e. g., 5 to 20 percent. The plates are allowed to soak for considerable period of time, for example an hour or more, and are subsequently removed, washed and baked at a temperature of 150° or 200° C. in order to harden the films.

The forms of the invention herein disclosed are to be considered merely as exemplary. It will be apparent to those skilled in the art that numerous modifications may be made therein without departure from the spirit of the invention or the scope of the appended claim.

What I claim is:

A process of imparting high resistance to the transmission of ultra-violet and infra-red rays to a sheet of ordinary glass which is low in such resistance, which process consists in etching said sheet with a strong mineral acid until a superficial film which is enriched in silica and impoverished in alkali and alkali earth metals is formed thereupon, the etching being discontinued when the film is approximately of a thickness to produce a coloration and is of less reflectance than the original surface of the glass, then applying to the film ferrous and ferric salts in water solution in order to effect a base exchange between the film and the solution to impregnate the film with ferrous and ferric compounds, then washing the sheet and baking it at about 150 to 200° C. in order to harden the film.

FREDERICK W. ADAMS.